(12) United States Patent
Stankevichus et al.

(10) Patent No.: US 10,996,986 B2
(45) Date of Patent: May 4, 2021

(54) METHOD AND SYSTEM FOR SCHEDULING I/O OPERATIONS FOR EXECUTION

(71) Applicant: YANDEX EUROPE AG, Lucerne (CH)

(72) Inventors: Aleksey Alekseevich Stankevichus, Moscow (RU); Sergey Vladimirovich Trifonov, Moskovskaya obl (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/504,040

(22) Filed: Jul. 5, 2019

(65) Prior Publication Data
US 2020/0192704 A1 Jun. 18, 2020

(30) Foreign Application Priority Data
Dec. 13, 2018 (RU) ............................ RU2018144176

(51) Int. Cl.
*G06F 9/48* (2006.01)
*G06F 9/50* (2006.01)
(Continued)

(52) U.S. Cl.
CPC .......... *G06F 9/4887* (2013.01); *G06F 3/0659* (2013.01); *G06F 9/48* (2013.01);
(Continued)

(58) Field of Classification Search
CPC ........ G06F 9/48; G06F 9/4806; G06F 9/4843; G06F 9/4881; G06F 9/4887; G06F 9/50; G06F 9/5005; G06F 3/0659
See application file for complete search history.

(56) References Cited

U.S. PATENT DOCUMENTS

| 5,247,677 A | 9/1993 | Welland et al. |
| 5,278,984 A | 1/1994 | Batchelor |

(Continued)

FOREIGN PATENT DOCUMENTS

| CN | 105653365 A | 6/2016 |
| CN | 103514037 B | 6/2018 |

(Continued)

OTHER PUBLICATIONS

Kumar et al, "Optimized Particle Swarm Optimization Based Deadline Constrained Task Scheduling in Hybrid Cloud", ICTACT Journal of Soft Computing, Jan. 2016, vol. 06, Issue 02, pp. 1117-1122 (Year: 2016).*

(Continued)

*Primary Examiner* — Charles M Swift
(74) *Attorney, Agent, or Firm* — BCF LLP

(57) ABSTRACT

A hybrid scheduler for and a method of scheduler I/O operations for execution are disclosed. The hybrid scheduler has a first a second scheduler. The method includes receiving I/O operations from a first and second I/O source and executing, by the first scheduler, a first algorithm to determine a scheduling order of the I/O operations based on the bandwidth of a memory drive. The method also includes transmitting this order of I/O operations to the second scheduler that executes a second algorithm to determine a rescheduled order of I/O operations based on respective execution deadlines. The method also includes monitoring whether execution of the I/O operations respects the respective execution deadlines. In response to determining that the execution of at least one I/O operation does not respect the respective execution deadline, the method includes pausing accepting additional I/O operations by the second scheduler from the first scheduler.

30 Claims, 4 Drawing Sheets

(51) Int. Cl.
    *G06F 3/06* (2006.01)
    *G06F 9/46* (2006.01)
(52) U.S. Cl.
    CPC .......... *G06F 9/4806* (2013.01); *G06F 9/4843* (2013.01); *G06F 9/4881* (2013.01); *G06F 9/50* (2013.01); *G06F 9/5005* (2013.01); *G06F 9/5066* (2013.01); *G06F 9/466* (2013.01)

(56) References Cited

U.S. PATENT DOCUMENTS

| | | |
|---|---|---|
| 5,577,202 A | 11/1996 | Padgett |
| 5,640,563 A | 6/1997 | Carmon |
| 5,845,316 A | 12/1998 | Hillyer et al. |
| 6,023,720 A | 2/2000 | Aref et al. |
| 6,256,755 B1 | 7/2001 | Hook et al. |
| 6,553,472 B2 | 4/2003 | Yang et al. |
| 6,757,897 B1 | 6/2004 | Shi et al. |
| 6,791,992 B1 | 9/2004 | Yun et al. |
| 6,851,115 B1 | 2/2005 | Cheyer et al. |
| 6,859,931 B1 | 2/2005 | Cheyer et al. |
| 7,073,021 B2 | 7/2006 | Iren et al. |
| 7,177,866 B2 | 2/2007 | Holenstein et al. |
| 7,474,989 B1 | 1/2009 | Wilcoxon |
| 7,562,362 B1 | 7/2009 | Paquette et al. |
| 7,971,093 B1 | 6/2011 | Goel et al. |
| 8,037,024 B1 | 10/2011 | Bozkaya et al. |
| 8,117,621 B2 | 2/2012 | Singh et al. |
| 8,145,838 B1 | 3/2012 | Miller et al. |
| 8,254,172 B1 | 8/2012 | Kan et al. |
| 8,595,302 B2 | 11/2013 | Krishnamurthi et al. |
| 8,799,913 B2 | 8/2014 | Yoo et al. |
| 8,826,301 B2 | 9/2014 | Kim et al. |
| 8,838,539 B1 | 9/2014 | Ashcraft et al. |
| 8,850,018 B2 | 9/2014 | Massa et al. |
| 8,850,446 B2 | 9/2014 | Avni et al. |
| 8,930,954 B2 | 1/2015 | Hildrum et al. |
| 8,966,490 B2 | 2/2015 | Avni et al. |
| 9,037,826 B1 | 5/2015 | Brooker et al. |
| 9,047,331 B2 | 6/2015 | Rao et al. |
| 9,093,160 B1 | 7/2015 | Ellis et al. |
| 9,203,900 B2 | 12/2015 | Rao et al. |
| 9,251,195 B2 | 2/2016 | Yamada |
| 9,304,694 B2 | 4/2016 | Colgrove et al. |
| 9,348,592 B2 | 5/2016 | Jha |
| 9,354,813 B1 | 5/2016 | Dolan et al. |
| 9,400,682 B2 | 7/2016 | Persikov et al. |
| 9,477,521 B2 | 10/2016 | Truong et al. |
| 9,489,443 B1 | 11/2016 | Muniswamy-Reddy et al. |
| 9,547,528 B1 | 1/2017 | McClure et al. |
| 9,569,339 B1 | 2/2017 | Villalobos et al. |
| 9,639,396 B2 | 5/2017 | Pho et al. |
| 9,699,017 B1 | 7/2017 | Gupta et al. |
| 9,811,391 B1 | 11/2017 | Barrett |
| 9,921,557 B2 | 3/2018 | Slupik et al. |
| 10,552,215 B1 | 2/2020 | Xu et al. |
| 10,572,323 B1 | 2/2020 | Zhai et al. |
| 2002/0099756 A1* | 7/2002 | Catthoor ................ G06F 30/30 718/102 |
| 2003/0115410 A1 | 6/2003 | Shriver |
| 2004/0213387 A1 | 10/2004 | Chandrasekaran |
| 2005/0047425 A1 | 3/2005 | Liu et al. |
| 2007/0002750 A1 | 1/2007 | Sang et al. |
| 2007/0226332 A1 | 9/2007 | Becker-Szendy et al. |
| 2007/0268516 A1 | 11/2007 | Bugwadia et al. |
| 2007/0282660 A1 | 12/2007 | Forth et al. |
| 2008/0049633 A1 | 2/2008 | Edwards et al. |
| 2008/0168452 A1 | 7/2008 | Molaro et al. |
| 2008/0320482 A1* | 12/2008 | Dawson ................ G06F 9/5072 718/104 |
| 2009/0013154 A1 | 1/2009 | Du et al. |
| 2009/0292744 A1 | 11/2009 | Matsumura |
| 2009/0300449 A1 | 12/2009 | Qian et al. |
| 2010/0011182 A1 | 1/2010 | Le Moal et al. |
| 2010/0035581 A1 | 2/2010 | Park et al. |
| 2010/0185847 A1 | 7/2010 | Shasha et al. |
| 2011/0145830 A1 | 6/2011 | Yamaguchi |
| 2011/0153566 A1 | 6/2011 | Larson et al. |
| 2011/0196834 A1 | 8/2011 | Kesselman et al. |
| 2011/0219100 A1 | 9/2011 | Dhuse et al. |
| 2011/0261698 A1 | 10/2011 | Kamerkar et al. |
| 2011/0314070 A1 | 12/2011 | Brown et al. |
| 2012/0046807 A1 | 2/2012 | Ruther et al. |
| 2012/0047317 A1 | 2/2012 | Yoon et al. |
| 2012/0066449 A1 | 3/2012 | Colgrove et al. |
| 2012/0124273 A1 | 5/2012 | Goss et al. |
| 2012/0204265 A1 | 8/2012 | Judge |
| 2012/0278801 A1 | 11/2012 | Nelson et al. |
| 2013/0042156 A1 | 2/2013 | Srinivasan et al. |
| 2013/0132057 A1 | 5/2013 | Deng et al. |
| 2013/0191836 A1 | 7/2013 | Meyer |
| 2013/0326161 A1 | 12/2013 | Cohen et al. |
| 2014/0019987 A1 | 1/2014 | Verma et al. |
| 2014/0074623 A1 | 3/2014 | Mohammadi et al. |
| 2014/0157276 A1 | 6/2014 | Smithson et al. |
| 2014/0208327 A1 | 7/2014 | Cadambi et al. |
| 2014/0226565 A1 | 8/2014 | Velev et al. |
| 2014/0250438 A1 | 9/2014 | Shin et al. |
| 2014/0282572 A1* | 9/2014 | Kang ................ G06F 9/4881 718/103 |
| 2014/0304601 A1 | 10/2014 | Rossano et al. |
| 2015/0127625 A1 | 5/2015 | Bulkowski et al. |
| 2015/0128149 A1 | 5/2015 | Meijer et al. |
| 2015/0237157 A1 | 8/2015 | Wang et al. |
| 2015/0347185 A1 | 12/2015 | Holt et al. |
| 2015/0347211 A1 | 12/2015 | Dang et al. |
| 2015/0347554 A1 | 12/2015 | Vasantham et al. |
| 2016/0149964 A1 | 5/2016 | Pastro |
| 2016/0188376 A1 | 6/2016 | Rosas et al. |
| 2016/0266934 A1 | 9/2016 | Rimoni |
| 2016/0291885 A1 | 10/2016 | Pendharkar et al. |
| 2017/0017676 A1 | 1/2017 | Levy et al. |
| 2017/0031713 A1 | 2/2017 | Campbell et al. |
| 2017/0048021 A1 | 2/2017 | Yanovsky et al. |
| 2017/0109203 A1 | 4/2017 | Liu et al. |
| 2017/0147488 A1 | 5/2017 | Vaquero |
| 2017/0177697 A1 | 6/2017 | Lee et al. |
| 2017/0308403 A1* | 10/2017 | Turull ................ G06F 9/4555 |
| 2017/0374516 A1 | 12/2017 | Huo et al. |
| 2018/0006999 A1 | 1/2018 | Doukhvalov et al. |
| 2018/0041477 A1 | 2/2018 | Shaposhnik |
| 2018/0052710 A1 | 2/2018 | Choi et al. |
| 2018/0101448 A1 | 4/2018 | Ventura et al. |
| 2018/0114290 A1 | 4/2018 | Paltashev et al. |
| 2018/0157543 A1 | 6/2018 | Bellomo et al. |
| 2018/0260125 A1 | 9/2018 | Botes et al. |
| 2018/0293123 A1 | 10/2018 | Kondapalli et al. |
| 2018/0300385 A1 | 10/2018 | Merriman et al. |
| 2019/0163546 A1 | 5/2019 | Ungar et al. |
| 2019/0171763 A1 | 6/2019 | Cai Le et al. |
| 2020/0252761 A1 | 8/2020 | Podluzhny |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2273105 C2 | 3/2006 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |
| RU | 2670573 C2 | 10/2018 |

(56) References Cited

FOREIGN PATENT DOCUMENTS

| WO | 2012065018 A2 | 5/2012 |
|---|---|---|
| WO | 2016197716 A1 | 12/2016 |

OTHER PUBLICATIONS

Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Year: 2015).*
Chopra et al, "Deadline and Cost based Workflow Scheduling in Hybrid Cloud", 2013, IEEE, pp. 840-846 (Year: 2013).*
Yuan et al, "Deadline divison-based heuristic for cost optimization in workflow scheduling". Information Sciences 179 (2009) 2562-2575, Elsevier, pp. 2562-2575 (Year: 2009).*
Srinivasan et al, "Deadline-based scheduling of periodic task systems on multiprocessors", Information Processing Letters 84 (2002), 93-98, Elsevier, pp. 93-98 (Year: 2002).*
Grefen et al. "Two-Layer Transaction Management for Workflow Management Applications", Database and Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Russian Search Report dated Nov. 8, 2019 issued in respect of the Russian Patent Application No. RU2018132711.
Russian Search Report dated Nov. 26, 2019 issued in respect of the Russian Patent Application No. RU2018144176.
Russian Search Report dated Nov. 26, 2019 issued in respect of the Russian Patent Application No. RU2018132714.
Russian Search Report dated Nov. 25, 2019 issued in respect of the Russian Patent Application No. RU2018135452.
Russian Search Report dated Feb. 25, 2020 issued in respect of the Russian Patent Application No. RU2018147497.
Russian Search Report dated Feb. 25, 2010 issued in respect of the Russian Patent Application No. RU2018135460.
Ex Parte Quale Action dated Apr. 23, 2020 received in respect of a related U.S. Appl. No. 16/383,976.
Notice of Allowance dated Oct. 15, 2020 received in respect of a related U.S. Appl. No. 16/433,186.
Ex Parte Quale Action dated Oct. 22, 2020 received in respect of a related U.S. Appl. No. 16/560,409.
Russian Search Report dated Oct. 30, 2019 issued in respect of the Russian Patent Application No. RU2018136221.
Ruemmier "An Introduction to Disk Drive Modeling", Hewlett Packard Laboratories, IEEE, Mar. 1994, pp. 17-29, (Year 1994).
IEEE 100, The Authoritative Dictionary of IEEE Standards Terms, Seventh Edition, IEEE Press, 2000, pp. 245, 1184 (Year: 2000).
Office Action dated Nov. 12, 2020 received in respect of a related U.S. Appl. No. 16/367,537.
Office Action dated Nov. 20, 2020 received in respect of a related U.S. Appl. No. 16/776,011.
Office Action dated Dec. 4, 2020 received in respect of a related U.S. Appl. No. 16/401,688.
Office Action dated Jan. 1, 2021 received in respect of a related U.S. Appl. No. 16/384,301.
Russian Search Report dated Jan. 18, 2021 issued in respect of the Russian Patent Application No. RU2019103253.
Office Action dated Mar. 10, 2021 received in respect of a related U.S. Appl. No. 16/367,537.
Notice of Allowance dated Mar. 23, 2021 received in respect of a related U.S. Appl. No. 16/574,277.

* cited by examiner

METHOD AND SYSTEM FOR SCHEDULING I/O OPERATIONS FOR EXECUTION

CROSS-REFERENCE

The present application claims priority to Russian Patent Application No. 2018144176, entitled "Method and System for Scheduling I/O Operations for Execution", filed Dec. 13, 2018, the entirety of which is incorporated herein by reference.

FIELD

The present technology relates to distributed data processing and, specifically, to a method and system for scheduling I/O operations for execution.

BACKGROUND

Storage requirements for storing digital data are continuously increasing due to the large volume of digital data that is being created everyday. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, spans multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

SUMMARY

Developers of the present technology have appreciated certain technical drawbacks associated with prior art solutions for keeping data available, accessible and for avoiding data loss.

In a first broad aspect of the present technology, there is provided a method of scheduling I/O operations for execution by a memory drive. The memory drive is implemented as part of a distributed computer-processing system that has a plurality of I/O sources that provides the I/O operations. The plurality of I/O sources has a first I/O source and a second I/O source. Each one of the first I/O source and the second I/O source is associated with a respective pre-determined proportion of processing bandwidth of the memory drive for executing the respective I/O operations of the first I/O source and of the second I/O source. The distributed computer-processing system has a hybrid I/O operations scheduler. The hybrid I/O operations scheduler has a first I/O scheduler and a second I/O scheduler. The method id executable by the hybrid I/O operations scheduler. The method comprises receiving, by the first I/O scheduler, (i) at least one I/O operation originated by the first I/O source and (ii) at least one I/O operation originated by the second I/O source. The method comprises executing, by the first I/O scheduler, a first scheduling algorithm to determine a scheduling order of the at least one I/O operation originated by the first I/O source and at least one I/O operation originated by the second I/O source. The first scheduling algorithm is based on the respective pre-determined proportion of processing bandwidth of the memory drive associated with the first I/O source and the second I/O source. The execution of the first scheduling algorithm resulting in a first-scheduled order of I/O operations. The method comprises transmitting the first-scheduled order of I/O operations to the second I/O scheduler. The method comprises executing, by the second I/O scheduler, a second scheduling algorithm to determine a rescheduled order of I/O operations for the first-scheduled order of I/O operations. The second scheduling algorithm is based on respective execution deadlines of the at least one I/O operations originated by the first I/O source and the at least one I/O operations originated by the second I/O source. The method comprises monitoring, by the hybrid I/O operations scheduler, whether execution of the at least one I/O operations originated by the first I/O source and the at least one I/O operations originated by the second I/O source respects the respective execution deadlines. The method comprises in response to determining that the execution of at least one I/O operation does not respect the respective execution deadline, pausing accepting additional I/O operations by the second I/O scheduler from the first I/O scheduler.

In some embodiments of the method, the monitoring whether the execution of the at least one I/O operations originated by the first I/O source and the at least one I/O operations originated by the second I/O source respects the respective execution deadlines comprises: monitoring, by the second I/O scheduler, whether the at least one I/O operations originated by the first I/O source and the at least one I/O operations originated by the second I/O source are executable before the respective execution deadlines.

In some embodiments of the method, the determining that the execution of at least one I/O operation does not respect the respective execution deadline comprises: determining, by the second I/O scheduler, that the at least one I/O operation is not going to be executed by the memory drive before the respective execution deadline if transmitted to the memory drive in accordance with rescheduled order of I/O operations.

In some embodiments of the method, the determining that the execution of at least one I/O operation does not respect the respective execution deadline comprises: determining, by the second I/O scheduler, that the at least one I/O operation is not going to be executed by the memory drive before the respective execution deadline if an additional I/O operation is received from the first I/O scheduler.

In some embodiments of the method, the monitoring whether the execution of the at least one I/O operations originated by the first I/O source and the at least one I/O operations originated by the second I/O source respects the respective execution deadlines comprises: monitoring, by the hybrid I/O operations scheduler, whether the at least one I/O operations originated by the first I/O source and the at least one I/O operations originated by the second I/O source are actually executed before the respective execution deadlines.

In some embodiments of the method, the determining that the execution of at least one I/O operation does not respect the respective execution deadline comprises: determining, by the hybrid I/O operations scheduler, that the at least one I/O operation is not actually executed by the memory drive before the respective execution deadline.

In some embodiments of the method, the pausing comprises stopping, by the second I/O scheduler, accepting additional I/O operations by the second I/O operations scheduler.

The method of claim 1, wherein the pausing comprises transmitting, by the second I/O scheduler, a feedback signal to the first I/O operations scheduler, where the feedback signal is instrumental in the first I/O operations scheduler stopping sending additional I/O operations to the second I/O operations scheduler.

In some embodiments of the method, the method further comprises: receiving, by the first I/O operations scheduler, at least one additional I/O operations originated by the first I/O source; and receiving, by the first I/O operations scheduler, at least one additional I/O operations originated by the second I/O source.

In some embodiments of the method, the method further comprises resuming, by the second I/O operations scheduler, receiving the additional I/O operations from the first I/O scheduler.

In some embodiments of the method, the resuming is executed in response to determining, by the hybrid I/O operations scheduler, that the execution of further I/O operations received by the second I/O scheduler does respect the respective execution deadlines.

In some embodiments of the method, the first I/O scheduler is a DRR-type scheduler.

In some embodiments of the method, the second I/O scheduler is an EDF-type scheduler.

In some embodiments of the method, the hybrid I/O operations scheduler operates: in a standard mode of operation when the second I/O scheduler accepts the additional I/O operations from the first I/O scheduler; and in a high-demand mode of operation when the second I/O scheduler pauses accepting additional I/O operations from the first I/O scheduler.

In some embodiments of the method, in the standard mode of operation, the hybrid I/O operations scheduler: provides a fair allocation of processing bandwidth of the memory drive for each one of the first I/O source and the second I/O source; and supports a real-time requirements of the first I/O source and the second I/O source. In the high-demand mode of operation, the hybrid I/O operations scheduler: provides the fair allocation of processing bandwidth of the memory drive for each one of the first I/O source and the second I/O source.

In a second broad aspect of the present technology, there is provided a hybrid I/O operations scheduler for scheduling I/O operations for execution by a memory drive, the memory drive is implemented as part of a distributed computer-processing system that has a plurality of I/O sources providing the I/O operations. The plurality of I/O sources has a first I/O source and a second I/O source. Each one of the first I/O source and the second I/O source is associated with a respective pre-determined proportion of processing bandwidth of the memory drive for executing the respective I/O operations of the first I/O source and of the second I/O source. The distributed computer-processing system has the hybrid I/O operations scheduler that has a first I/O scheduler and a second I/O scheduler. The hybrid I/O operations scheduler is configured to receive, by the first I/O scheduler: (i) at least one I/O operation originated by the first I/O source and (ii) at least one I/O operation originated by the second I/O source. The hybrid I/O operations scheduler is configured to execute, by the first I/O scheduler, a first scheduling algorithm to determine a scheduling order of the at least one I/O operation originated by the first I/O source and at least one I/O operation originated by the second I/O source. The first scheduling algorithm is based on the respective pre-determined proportion of processing bandwidth of the memory drive associated with the first I/O source and the second I/O source. The execution of the first scheduling algorithm results in a first-scheduled order of I/O operations. The hybrid I/O operations scheduler is configured to transmit the first-scheduled order of I/O operations to the second I/O scheduler. The hybrid I/O operations scheduler is configured to execute, by the second I/O scheduler, a second scheduling algorithm to determine a rescheduled order of I/O operations for the first-scheduled order of I/O operations. The second scheduling algorithm is based on respective execution deadlines of the at least one I/O operations originated by the first I/O source and the at least one I/O operations originated by the second I/O source. The hybrid I/O operations scheduler is configured to monitor whether execution of the at least one I/O operations originated by the first I/O source and the at least one I/O operations originated by the second I/O source respects the respective execution deadlines. The hybrid I/O operations scheduler is configured to in response to determining that the execution of at least one I/O operation does not respect the respective execution deadline, pause accepting additional I/O operations by the second I/O scheduler from the first I/O scheduler.

In some embodiments of the hybrid I/O operations scheduler, the hybrid I/O operations scheduler configured to monitor whether the execution of the at least one I/O operations originated by the first I/O source and the at least one I/O operations originated by the second I/O source respects the respective execution deadlines comprises the hybrid I/O operations scheduler configured to monitor whether the at least one I/O operations originated by the first I/O source and the at least one I/O operations originated by the second I/O source are executable before the respective execution deadlines.

In some embodiments of the hybrid I/O operations scheduler, the hybrid I/O operations scheduler configured to determine that the execution of at least one I/O operation does not respect the respective execution deadline comprises the hybrid I/O operations scheduler configured to: determine that the at least one I/O operation is not going to be executed by the memory drive before the respective execution deadline if transmitted to the memory drive in accordance with rescheduled order of I/O operations.

In some embodiments of the hybrid I/O operations scheduler, the hybrid I/O operations scheduler configured to determine that the execution of at least one I/O operation does not respect the respective execution deadline comprises the hybrid I/O operations scheduler configured to: determine that the at least one I/O operation is not going to be executed by the memory drive before the respective execution deadline if an additional I/O operation is received from the first I/O scheduler.

In some embodiments of the hybrid I/O operations scheduler, the hybrid I/O operations scheduler configured to monitor whether the execution of the at least one I/O operations originated by the first I/O source and the at least one I/O operations originated by the second I/O source respects the respective execution deadlines comprises the hybrid I/O operations scheduler configured to: monitor whether the at least one I/O operations originated by the first I/O source and the at least one I/O operations originated by the second I/O source are actually executed before the respective execution deadlines.

In some embodiments of the hybrid I/O operations scheduler, the hybrid I/O operations scheduler configured to determine that the execution of at least one I/O operation does not respect the respective execution deadline comprises the hybrid I/O operations scheduler configured to: determine that the at least one I/O operation is not actually executed by the memory drive before the respective execution deadline.

In some embodiments of the hybrid I/O operations scheduler, the hybrid I/O operations scheduler configured to pause comprises the hybrid I/O operations scheduler configured to stop accepting additional I/O operations by the second I/O operations scheduler.

In some embodiments of the hybrid I/O operations scheduler, the hybrid I/O operations scheduler configured to pause comprises the hybrid I/O operations scheduler configured to transmit, by the second I/O scheduler, a feedback signal to the first I/O operations scheduler, where the feedback signal is instrumental in the first I/O operations scheduler stopping sending additional I/O operations to the second I/O operations scheduler.

In some embodiments of the hybrid I/O operations scheduler, the hybrid I/O operations scheduler is configured to: receive, by the first I/O operations scheduler, at least one additional I/O operations originated by the first I/O source; and receive, by the first I/O operations scheduler, at least one additional I/O operations originated by the second I/O source.

In some embodiments of the hybrid I/O operations scheduler, the hybrid I/O operations scheduler is further configured to resume receiving by the second I/O operations scheduler the additional I/O operations from the first I/O scheduler.

In some embodiments of the hybrid I/O operations scheduler, the hybrid I/O operations scheduler configured to resume is executed in response to determining, by the hybrid I/O operations scheduler, that the execution of further I/O operations received by the second I/O scheduler does respect the respective execution deadlines.

In some embodiments of the hybrid I/O operations scheduler, the first I/O scheduler is a DRR-type scheduler.

In some embodiments of the hybrid I/O operations scheduler, the second I/O scheduler is an EDF-type scheduler.

In some embodiments of the hybrid I/O operations scheduler, the hybrid I/O operations scheduler operates: in a standard mode of operation when the second I/O scheduler accepts the additional I/O operations from the first I/O scheduler; and in a high-demand mode of operation when the second I/O scheduler pauses accepting additional I/O operations from the first I/O scheduler.

In some embodiments of the hybrid I/O operations scheduler, in the standard mode of operation, the hybrid I/O operations scheduler: provides a fair allocation of processing bandwidth of the memory drive for each one of the first I/O source and the second I/O source; and supports a real-time requirements of the first I/O source and the second I/O source. In the high-demand mode of operation, the hybrid I/O operations scheduler: provides the fair allocation of processing bandwidth of the memory drive for each one of the first I/O source and the second I/O source.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
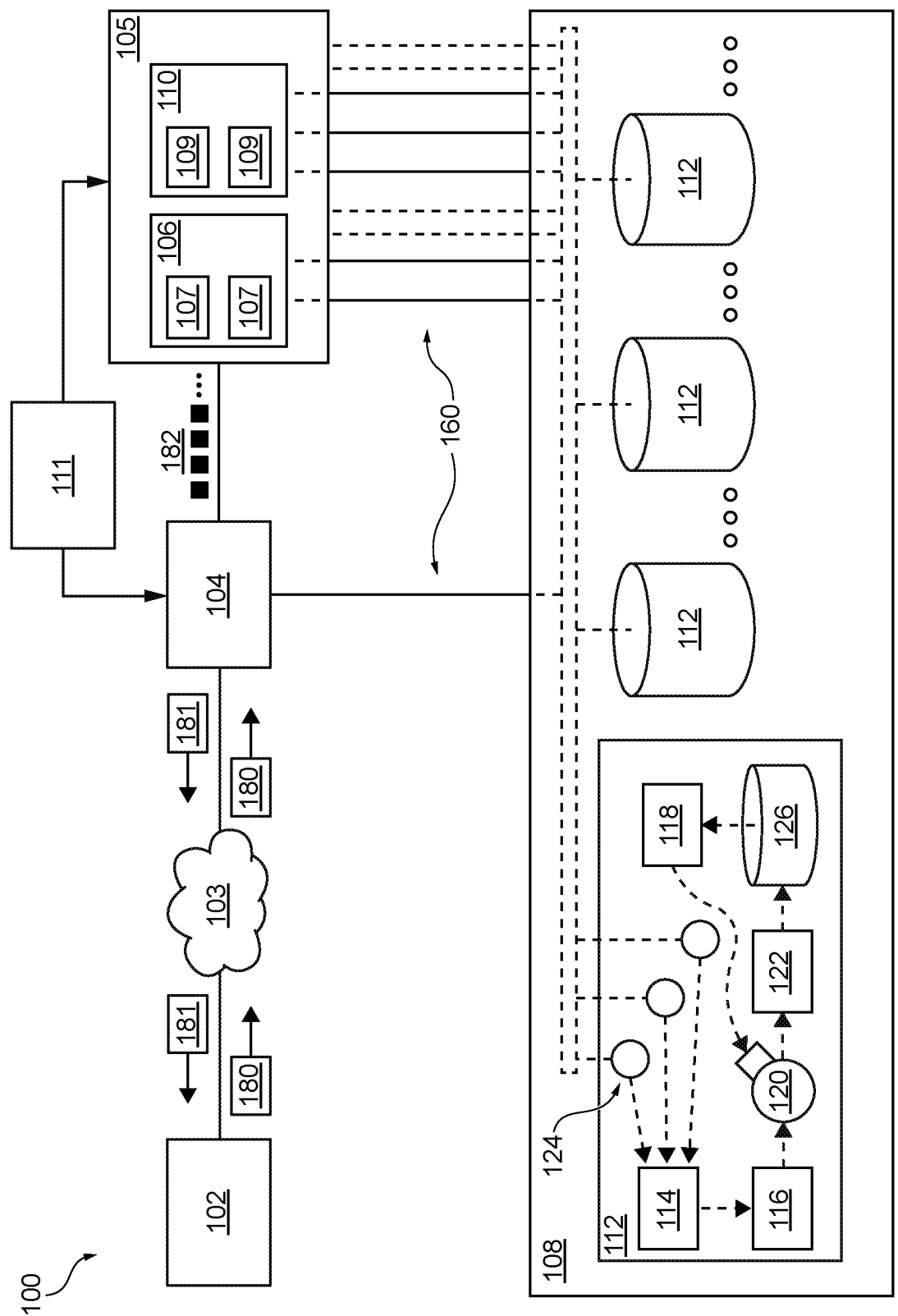
FIG. 1 depicts a system suitable for implementing non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100; however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transactions 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective transaction destination locations TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
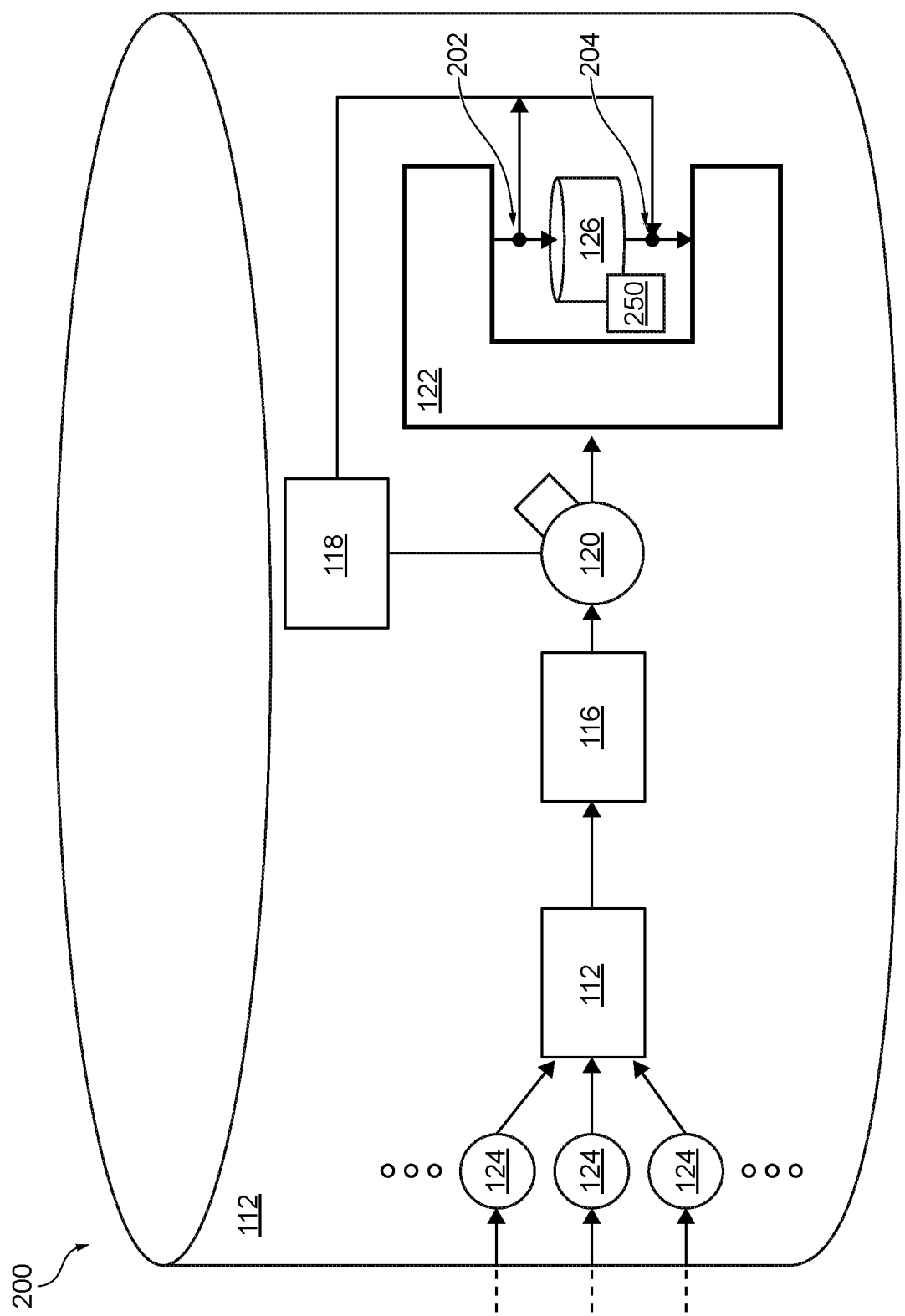
FIG. 2 depicts a storage device of a distributed storage sub-system of FIG. 1 in accordance with some embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programing Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the operation scheduling application 120 may be implemented as part of the Pdrive application 116. In other words, execution of various scheduling schemes may be performed by the Pdrive application 116, without departing from the scope of the present technology.

It is contemplated that, the operation scheduling application 120 may provide a hybrid scheduling scheme. For example, the operation scheduling application 120 may provide a scheduling scheme that is of a "fair" type and, under certain conditions, is also of a "real-time" type.

It should be noted that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In summary, the operation scheduling application 120 may provide a hybrid scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for a current execution, a most efficient one (from the perspective of the memory drive 126) amongst all the I/O operations available to the memory drive 126 at a given moment in time.

For that reason, in some cases, although the operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the operation scheduling application 120. Therefore, it may happen that the execution order may no longer respect the real-time requirements of the distributed processing system 100 (especially as additional I/O operations are received from the operation scheduling application 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the operation scheduling application 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Hybrid I/O Scheduler

As previously alluded to, the Pdrive application 116 may be communicatively coupled to the operation scheduling application 120. In other embodiments, it is contemplated that the operation scheduling application 120 may be implemented as part of the Pdrive application 116 that is, execution of various scheduling schemes may be performed by the Pdrive application 116, without departing from the scope of the present technology.

Also, as previously mentioned, the operation scheduling application 120 may provide a hybrid scheduling scheme. Put another way, the operation scheduling application 120 may provide a scheduling scheme that may be able to order the I/O operations for transmission of the memory drive 126 (or transmission to the real-time operation enforcing application 122 which then transmits the I/O operations to the memory drive 126) for execution such that the pre-determined proportions of drive bandwidth for each respective SM is respected and that respective deadlines of the I/O operations are also respected.

Figure 3:
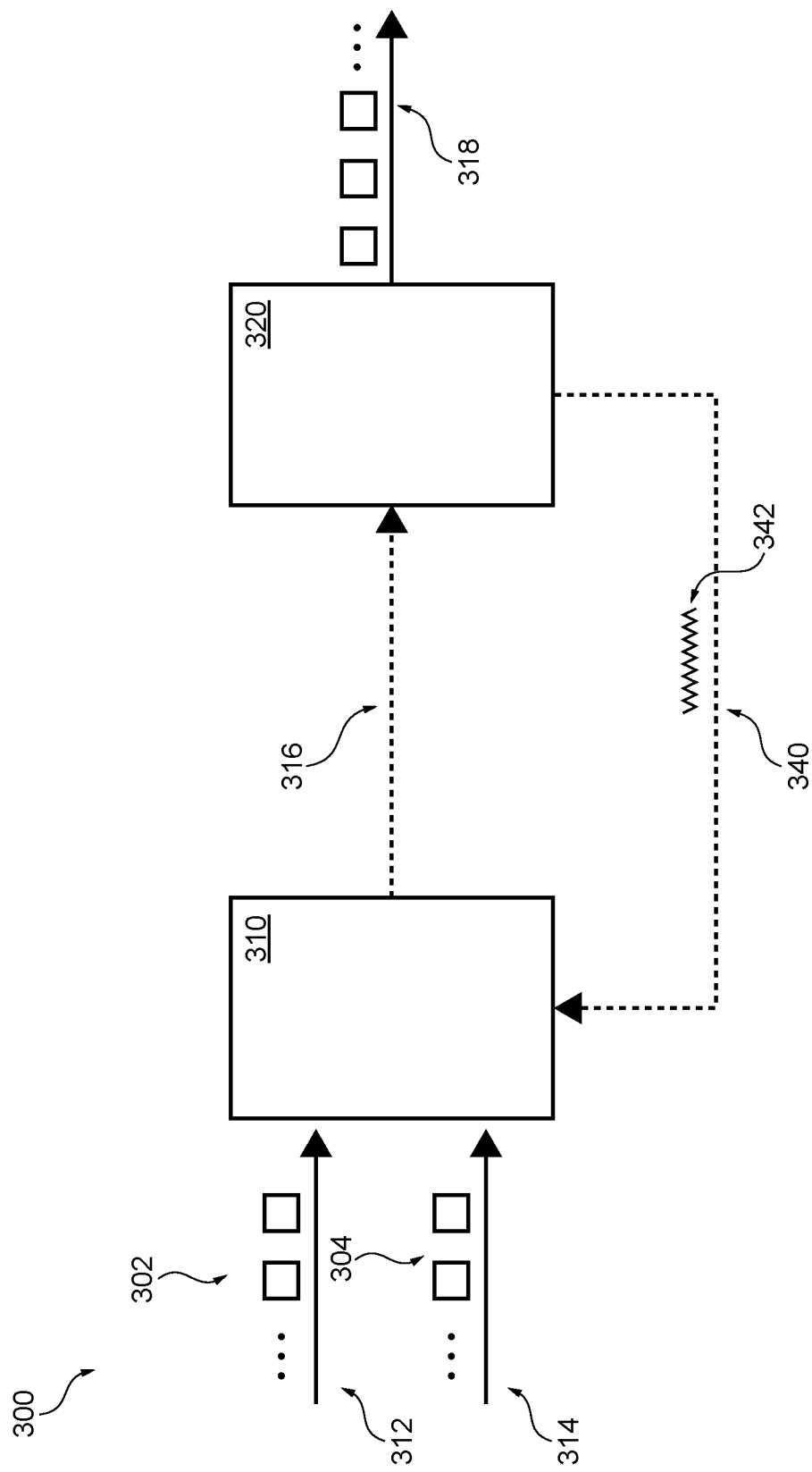
FIG. 3 depicts a hybrid scheduler for scheduling I/O operations for execution by a memory drive of FIG. 1.

With reference to FIG. 3, there is depicted a hybrid scheduler 300 for I/O operations. In one non-limiting example, the operation scheduling application 120 employing a hybrid scheduling scheme may be implemented as the hybrid scheduler 300. Naturally, this means that the hybrid scheduler 300 may be communicatively coupled to the Pdrive application 116 and/or may be implemented as part of the Pdrive application 116.

The hybrid scheduler 300 includes a first scheduler 310 and a second scheduler 320. Generally speaking, the first scheduler 310 is configured to execute a fair-type scheduling scheme, while the second scheduler 320 is configured to execute a real-time-type scheduling scheme. To that end, the first scheduler 310 may be configured to implement a fair-type scheduling algorithm, while the second scheduler 320 may be configured to implement a real-time-type scheduling algorithm.

Generally speaking, a given scheduling algorithm may be employed by a given scheduler for ordering I/O operations received by the given scheduler based on some pre-defined criteria, thus providing a given scheduling scheme for the I/O operations based on the some pre-defined criteria. For example, the fair-type scheduling algorithm may be employed by the first scheduler 310 for ordering I/O operations (received by the first scheduler 310) based on inter alia the drive processing bandwidth of the memory drive 126. In another example, the real-time-type scheduling algorithm may be employed by the second scheduler 320 for ordering I/O operations (received by the second scheduler 320) based on inter alia deadlines of respective I/O operations.

How the first scheduler 310 is configured to provide the fair-type scheduling scheme for I/O operations received by the first scheduler 310, and how the second scheduler 320 is configured to provide the real-time scheduling scheme for I/O operations received by the second scheduler 320 will now be described in turn.

It should be noted that I/O operations may be transmitted to the hybrid scheduler 300 from, for example, more than one Vdrive applications 114. Therefore, it can be said the hybrid scheduler 300 may be receiving I/O operations from more than one I/O sources which may be embodied as respective Vdrive applications 114. For example, a first given Vdrive application 114 may be configured to generate I/O operations based on system data originating from a first given SM. In another example, a second given Vdrive application 114 may be configured to generate I/O operations based on system data originating from a second given SM. As such, the hybrid scheduler 300 may be configured to receive I/O operations that are generated by more than one I/O sources (e.g., the first given Vdrive application 114 and second given Vdrive application 114) based on system data originating from respective SMs.

In the depicted non-limiting example of FIG. 3, the first scheduler 310 may be configured to receive a first set of I/O operations 302 and a second set of I/O operations 304. The first scheduler 310 is configured to receive I/O operations from the first set of I/O operations 302, via a first communication link 312, corresponding to I/O operations generated by the first I/O source. In this example, the first communication link 312 may communicatively couple the first given Vdrive application 114 with the Pdrive application 116 for providing the first set of I/O operations 302 to the Pdrive application 116 that implements the hybrid scheduler 300.

Also, the first scheduler 310 may be configured to receive I/O operations from the second set of I/O operations 304, via a second communication link 314, corresponding to I/O operations generated by the second I/O source. In this example, the second communication link 314 may communicatively couple the second given Vdrive application 114 with the Pdrive application 116 for providing the second set of I/O operations 304 to the Pdrive application 116 that implements the hybrid scheduler 300.

It should be noted that, the first I/O source is associated with a first pre-determined proportion of drive bandwidth that the memory drive 126 may allocate for executing I/O operations from the first set of I/O operations 302. Similarly, the second I/O source is associated with a second pre-determined proportion of drive bandwidth that the memory drive 126 may allocate for executing I/O operations from the second set of I/O operations 304.

It is contemplated that the first pre-determined proportion and the second pre-determined proportion may have been determined by an operator of the distributed computer-processing system 100. It should also be noted that I/O operations of more than two I/O sources may be provided to the first scheduler 310, similarly to how the first set of I/O operations 302 and the second set of I/O operations 304 are provided to the first scheduler 310, without departing form the scope of the present technology.

The first scheduler 310 is configured to implement a given fair-type scheduling scheme that allows ordering the I/O operations from the first set of I/O operations 302 and from the second set of I/O operations 304 such that the drive bandwidth of the memory drive 126 for executing the ordered I/O operations is used in accordance with the first pre-determined proportion and the second pre-determined proportion. Put another way, the given fair-type scheduling scheme orders the I/O operations from the first set of I/O operations 302 and from the second set of I/O operations 304 such that the drive bandwidth of the memory drive 126 is used "fairly" which, in at least some of the non-limiting embodiments of the present technology, means in accordance with the respective first and second pre-determined proportions of drive bandwidth.

Thus, it can be said that the first scheduler 310 is employing the fair-type scheduling algorithm, as mentioned above, for generating a fair-scheduled order of I/O operations based on the first pre-determined proportion and the second pre-determined proportion of the drive bandwidth of the memory drive 126.

Which fair-type scheduling algorithm the first scheduler 310 is configured to implement is not particularly limiting.

However, in one non-limiting example, the first scheduler 310 may be implemented as a given Deficit Round Robin (DRR) scheduling algorithm, which means that the first scheduler 310 may be implemented as a DRR-type scheduler.

Irrespective of which specific fair-type scheduling algorithm the first scheduler 310 implements, the first scheduler 310 is configured to determine in which order I/O operations from the first set of I/O operations 302 and from the second set of I/O operations 304 are to be transmitted such that the drive bandwidth of the memory drive 126 is used in accordance with (i) the first pre-determined proportion of bandwidth allocated to the first I/O source and (ii) the second pre-determined proportion of bandwidth allocated to the second I/O source.

The first scheduler 310 is configured to transmit I/O operations, in the fair-scheduled order as explained above, to the second scheduler 320 via a communication link 316. Therefore, it can be said that the second scheduler 320 is configured to receive I/O operations from the first scheduler 310. Also, it can be said that I/O operations are received by the second scheduler 320 via the communication link 316 in the fair-scheduled order determined by the first scheduler 310.

It should be noted that I/O operations may be associated with respective deadlines that are indicative of a moment in time after which the execution of the respective I/O operations is no longer performed within an acceptable amount of time for supporting real-time requirements of the distributed processing system 100.

In order to support real-time requirements of the distributed processing system 100, the second scheduler 320 may provide a real-time scheduling scheme that may allow execution of I/O operations before (in accordance with) the respective deadlines. In other words, the second scheduler 320 is configured to order (or in this case, potentially re-order) the I/O operations for transmission to the memory drive 126 such that the I/O operations may be executed by the memory drive 126 before the respectively associated deadlines.

Thus, it can be said that the second scheduler 320 is employing the real-time-type scheduling algorithm, as mentioned above, for generating a real-time-scheduled order of I/O operations based on the respective deadlines of the I/O operations.

Which real-time-type scheduling algorithm the second scheduler 320 is configured to implement is not particularly limiting. However, in one non-limiting example, the second scheduler 320 may be implemented as a given Earliest Deadline First (EDF) scheduling algorithm, which means that the second scheduler 320 may be implemented as an EDF-type scheduler.

Irrespective of which specific real-time-type scheduling algorithm the second scheduler 320 implements, the second scheduler 320 is configured to determine a real-time-scheduled order of I/O operations received thereby for transmission for execution of I/O operations by the memory drive 126 before their respective deadlines.

The second scheduler 320 is configured to transmit I/O operations, in the real-time-scheduled order, as explained above, to the memory drive 126 (or, alternatively to the real-time operation enforcing application 122 which then transmits the I/O operations to the memory drive 126) via a communication link 318.

It should be noted that the hybrid scheduler 300 transmits a single stream of I/O operations. In other words, it contemplated that the hybrid scheduler 300 is not configured to "multiplex" I/O operations received thereby into multiple streams of I/O operations. Therefore, it can be said that the hybrid scheduler 300 is a non-multiplexing hybrid scheduler which provides a single stream of I/O operations (I/O operations as scheduled by the second scheduler 320 thereof).

In some embodiments of the present technology, it is contemplated that the hybrid scheduler 300 may be selectively operating in a "standard" mode of operation or in a "high-demand" mode of operation. How the hybrid scheduler 300 is configured to operate in the standard mode, under which conditions the hybrid scheduler 300 is configured to selectively switch from the standard mode to the high-demand mode of operation, and how the hybrid scheduler 300 is configured to operate in the high-demand mode of operation will now be described in turn.

Standard Mode of Operation

In the standard mode of operation, the hybrid scheduler 300 may be receiving I/O operations via more than one communication links, such as via the first communication link 312 and the second communication link 314, from more than one Vdrive applications 114 (e.g., I/O sources).

Each I/O operation received by the hybrid scheduler 300 may be associated with a respective deadline for execution and a pre-determined proportion of drive bandwidth allocated to the respectively associated I/O source.

The I/O operations being received by the hybrid scheduler 300, such as the I/O operations from the first set of I/O operations 302 and from the second set of I/O operations 304, are transmitted to the first scheduler 310. The first scheduler 310 employs the fair-type scheduling algorithm for ordering the I/O operations being transmitted thereto based on the pre-determined proportions of drive bandwidth allocated to the respective I/O sources, as explained above. As a result, in the standard mode of operation, the first scheduler 310 transmits the I/O operations being received thereby in the fair-scheduled order to the second scheduler 320 via the communication link 316.

In the standard mode of operation, the second scheduler 320 is receiving the I/O operations in the fair-scheduled order. The second scheduler 320 employs the real-time-type scheduling algorithm for ordering the I/O operations being transmitted thereto based on the respectively associated deadlines, as explained above. As a result, the second scheduler 320 transmits I/O operations in the real-time-scheduled order via the communication link 318.

Thus it can be said that the hybrid scheduler 300, when operating in the standard mode: (i) receives I/O operations from more than one I/O sources, (ii) orders them in the fair-scheduler order via the first scheduler 310, (iii) transmits them in the fair-scheduler order to the second scheduler 320, (iv) orders them in the real-time-scheduled order via the second scheduler 320, and (iv) transmits them via the communication link 318 to the memory drive 126 for execution (or to the real-time operation enforcing application 122 that then transmits them to the memory drive 126 for execution).

It is contemplated that in the standard mode of operation, the hybrid scheduler 300 may ensure that I/O operations are (i) executed such that the drive processing bandwidth of the memory drive 126 is used in accordance with the pre-determined proportions of bandwidth allocated to respective I/O sources, and (ii) executed before their respective deadlines. Put another way, the hybrid scheduler 300 operating in the standard mode of operation may ensure that I/O operations associated with more than one I/O sources are executed such that the drive bandwidth of the memory drive 126 is used "fairly" for executing the I/O operations associated with the more than one I/O sources, while supporting the real-time requirements of the distributed computer-processing system 100.

Conditions for Selectively Switching Modes of Operation

At a given moment in time, the hybrid scheduler 300 may be receiving a large number of I/O operations for scheduling for further execution by the memory drive 126. Thus, in some cases, even though the memory drive 126 is executing I/O operations, the memory drive 126 may not be able to "keep up" with the high processing demand due to the large number of I/O operations that need to be executed.

It should be recalled that, in the standard mode of operation, the first scheduler 310 receives I/O operations and sends them in a fair-scheduled order to the second scheduler 320. As such, the larger the number of I/O operations being received by the hybrid scheduler 300, the larger the number of I/O operations that are transmitted to the second scheduler 320 is. As a result, the second scheduler 320 is configured to apply the real-time-type scheduling algorithm onto a larger number of I/O operations for determining the real-time-scheduled order of I/O operations. Put another way, the real-time-type scheduling algorithm needs to, in a sense, "consider" a large number of I/O operations and their respective deadlines for determining the real-time-scheduled order of I/O operations.

It is contemplated that, during high-demand peaks (when a sufficiently large number of I/O operations are being sent to the hybrid scheduler 300), the hybrid scheduler 300 may selectively switch modes of operation. This means that during high-demand peaks, the hybrid scheduler 300 may selective switch from the standard mode of operation to the high-demand mode of operation.

It is contemplated that the selective switch between the modes of operation may be performed by the hybrid scheduler 300 by monitoring whether the execution of at least one I/O operation does not respect the respective execution deadline. For example, the second scheduler 320 is configured to monitor whether execution of I/O operations originated by the first I/O source and by the second I/O source respects the execution deadlines of the respective I/O operations.

This monitoring performed by the hybrid scheduler 300 may include an "a priori" analysis of execution of I/O operations and/or a "posteriori" analysis of execution of I/O operations. The "a priori" and the "posteriori" analyses that may be included as part of the monitoring performed by the hybrid scheduler 300 for selectively switching modes of operation will now be described.

During the monitoring with the "a priori" analysis, the second scheduler 320 may monitor whether the I/O operations received thereby are potentially executable before their respective deadlines. On the one hand, when the second scheduler 320 is able to determine a real-time-scheduled order of the received I/O operations in which I/O operations are potentially executable before their respective deadlines, the second scheduler 320 may selectively determine that the hybrid scheduler 300 is to operate in the standard mode of operation. On the other hand, when the second scheduler 320 is not able to determine a real-time-scheduled order of the received I/O operations in which I/O operations are potentially executable before their respective deadlines, the second scheduler 320 may selectively determine that the hybrid scheduler 300 is to operate in the high-demand mode of operation.

Hence, it can be said that the second scheduler 320 may selectively determine that the hybrid scheduler 300 is to operate in the high-demand mode of operation in response to determining that at least one I/O operation received thereby is not going to be executed by the memory drive 126 before the respective execution deadline if transmitted to the memory drive 126 in accordance with rescheduled order of I/O operations.

Additionally or alternatively, when monitoring is performed with the "a priori" analysis, the second scheduler 320 may selectively determine that the hybrid scheduler 300 is to operate in the high-demand mode of operation in response to determining that at least one I/O operation is not going to be executed by the memory drive 126 before the respective execution deadline if an additional I/O operation is received by the second scheduler 320 from the first scheduler 310. For example, the second scheduler 320 may determine that, by receiving the additional I/O operation and placing it in the rescheduled order of I/O operations based on the respective execution deadline, at least one I/O operation in the rescheduled order is not going to be executed by the memory drive 126 before its respective execution deadline.

During the monitoring with the "posteriori" analysis, the hybrid scheduler 300 may monitor whether the I/O operations in the rescheduled order transmitted to the memory drive 126 are actually executed before the respective execution deadlines. This means that, the hybrid scheduler 300 may selectively determine that the hybrid scheduler 300 is to operate in the high-demand mode of operation in response to determining that at least one I/O operation is not actually executed by the memory drive 126 before the respective execution deadline.

It is contemplated that in some embodiments of the present technology, where the monitoring is performed with the "posteriori" analysis, the hybrid scheduler 300 may be configured to receive execution confirmations of I/O operations that have been transmitted by the hybrid scheduler 300 to the memory drive 126 for execution. As such, if the execution of a given I/O operations has occurred after the respective execution deadline, the hybrid scheduler 300 may be configured to selectively switch into the high-demand mode of operation.

The hybrid scheduler 300 may perform this monitoring with the posteriori analysis in many different situations. In one non-limiting example, such a situation may occur due to the drive-internal logic 250, which as explained above is configured to select amongst the I/O operations available thereto a most efficient order of execution of I/O operations. As a result, in some cases, even though the I/O operations are transmitted by the hybrid scheduler 300 in the real-time-scheduled order in which I/O operations are potentially executable before their respective deadlines, the drive-internal logic 250 may instruct the memory drive 126 to execute the I/O operations in a potentially different order and in which some I/O operations will not be actually executed before their respective deadlines.

In summary, the selective switching between modes of operation by the hybrid scheduler 300 may be executed by monitoring whether the execution of at least one I/O operation does not respect the respective execution deadline. This monitoring may include the execution of the apriori analysis which aims at monitoring whether the I/O operations received by the second scheduler 320 are potentially executable before their respective deadlines. Additionally or alternatively, this monitoring may include the execution of the posteriori analysis which aims at monitoring whether the I/O operations (having been transmitted by the hybrid scheduler 300 in the real-time-scheduled order) have actually been executed by the memory drive 126 before their respective deadlines.

High-Demand Mode of Operation

Once the hybrid scheduler 300 determines that the hybrid scheduler 300 is to be selectively switched into the high-demand mode of operation, the second scheduler 320 is configured to pause accepting additional I/O operations from the first scheduler 310.

In some embodiments of the present technology, the second scheduler 320 may pause accepting additional I/O operations from the first scheduler 310 by stopping accepting additional I/O operations that the first scheduler 310 is transmitting thereto via the communication link 316.

In other embodiments of the present technology, the second scheduler 320 may pause accepting additional I/O operations from the first scheduler 310 by transmitting a feedback signal 342 via a communication link 340 as depicted in FIG. 3 to the first scheduler 310. The feedback signal 342 is instrumental in the first scheduler 310 stopping sending additional I/O operations to the second scheduler 320.

For example, the feedback signal 342 may be indicative of information having been determined by the second scheduler 320 during the monitoring. In another example, the feedback signal 342 may be indicative of computer-readable instructions which are sent to the first scheduler 310 for instructing the first scheduler 310 to stop sending additional I/O operations to the second scheduler 320.

Therefore, it is contemplated that during the high-demand mode of operation, the second scheduler 320 pauses accepting additional I/O operations from the first scheduler 310. This may allow the second scheduler 320 to deal with the I/O operations that it has already received and needs to order for transmission, before receiving the additional I/O operations from the first scheduler 310.

However, it should be noted that, while the second scheduler 320 pauses accepting additional I/O operations from the first scheduler 310, this does not mean that the first scheduler 310 needs itself to stop accepting I/O operations. For example, during the high-demand mode of operation, the first scheduler 310 may receive at least one additional I/O operations from the first set of I/O operations 302. In another example, during the high-demand mode of operation, the first scheduler 310 may receive at least one additional I/O operations from the second set of I/O operations 304.

It is contemplated that the at least one additional I/O operations received by the first scheduler 310 during the high-demand mode of operation are not returned to the respective I/O source. Indeed, the at least one additional I/O operations received by the first scheduler 310 during the high-demand mode of operation will remain at the first scheduler 310 until the hybrid scheduler 300 is selectively switched to the standard mode of operation.

It is contemplated that in some embodiments, the hybrid scheduler 300 may be configured to operate in the high-demand mode of operation until the hybrid scheduler 300 determines to selectively switch from the high-demand mode of operation to the standard mode of operation.

In some embodiments, it is contemplated that the hybrid scheduler 300 may selectively switch from the high-demand mode of operation to the standard mode of operation when the hybrid scheduler 300 determines that the execution of I/O operations at that moment in time does respect the respective execution deadline.

For example, at a given moment in time, a number of I/O operations left at the second scheduler 320 that still need to be transmitted for execution may be lower than at a moment in time when the hybrid scheduler 300 selectively switched into the high-demand mode of operation. Therefore, the second scheduler 320 may need to "consider" less I/O operations and therefore may need to "consider" less execution deadlines while determining the rescheduled order of I/O operations. Hence, at that given moment in time, the second scheduler 320 may determine a real-time-scheduled order of the received I/O operations in which I/O operations are potentially executable before their respective deadlines. As a result, the hybrid scheduler 300 may selectively switch from the high-demand mode of operation to the standard mode of operation.

In another example, at a given moment in time, the hybrid scheduler 300 may determine that I/O operations transmitted for execution are actually being executed before the respective execution deadlines (e.g., by receiving execution confirmations from the memory drive 126). As a result, the hybrid scheduler 300 may selectively switch from the high-demand mode of operation to the standard mode of operation.

In yet another example, at a given moment in time, the hybrid scheduler 300 may determine that all of the I/O operations received by the second scheduler 320 have been transmitted for execution. As a result, the hybrid scheduler 300 may selectively switch from the high-demand mode of operation to the standard mode of operation.

When the hybrid scheduler 300 selectively switches from the high-demand mode of operation to the standard mode of operation, the second scheduler 320 may selectively resume receiving (accepting) the additional I/O operations from the first scheduler 310.

For example, when the hybrid scheduler 300 determines to selectively switch from the high-demand mode of operation to the standard mode of operation, the second scheduler 320 may transmit another feedback signal (not depicted) to the first scheduler 310 via the communication link 340 for resuming the transmission of I/O operations in the fair-scheduled order to the second scheduler 320 via the communication link 316. As a result, the hybrid scheduler 300 is selectively switched back to the standard mode of operation.

Figure 4:
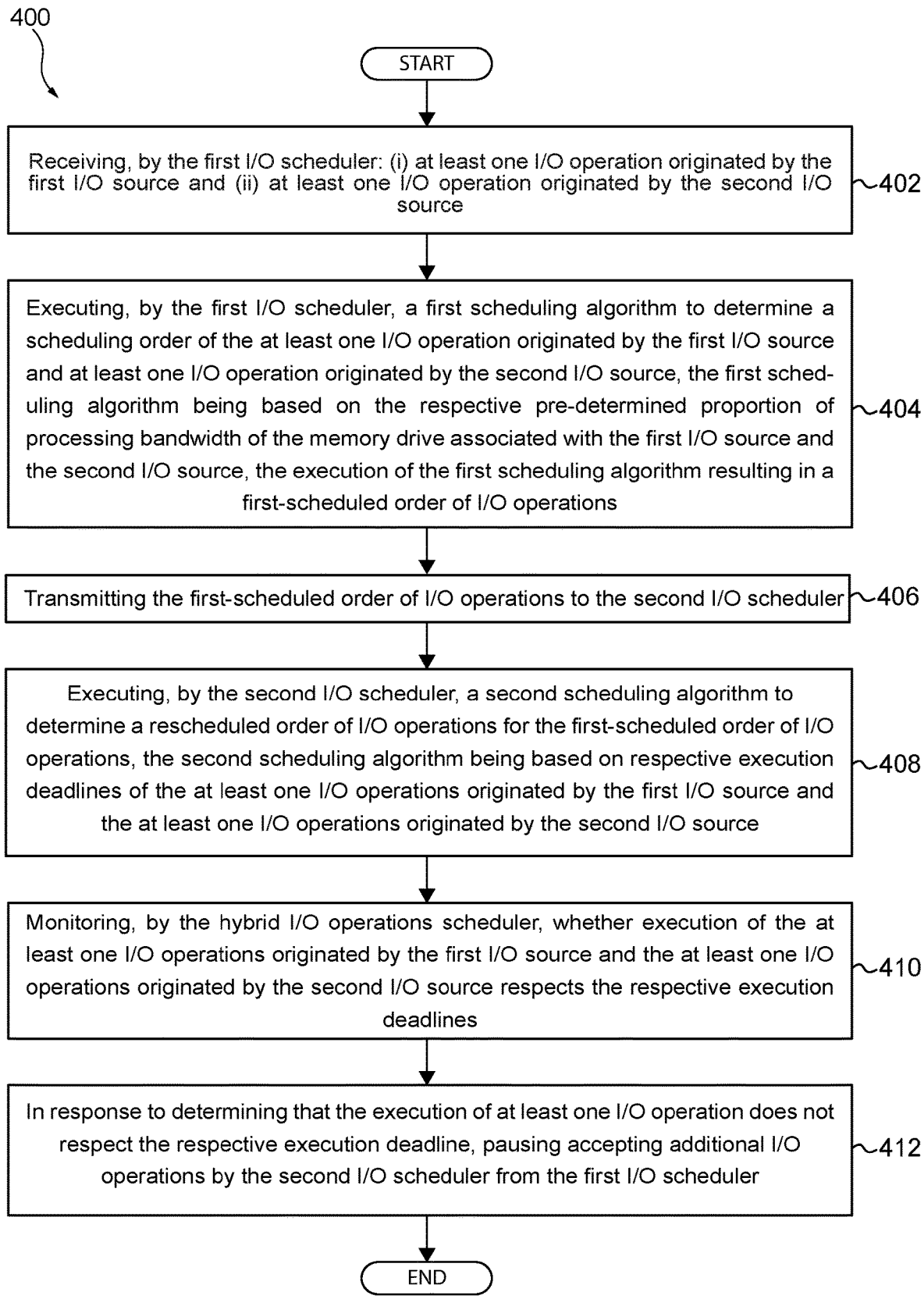
FIG. 4 depicts a block diagram of a method, the method being executable by the hybrid scheduler of FIG. 3 and being implemented in accordance with non-limiting embodiments of the present technology.

In some embodiments of the present technology, the hybrid scheduler 300 may be configured to execute a method 400 depicted in FIG. 4 for scheduling I/O operations for execution by the memory drive 126. The method 400 will now be described.

Step 402: Receiving, by the First I/O Scheduler: (I) at Least One I/O Operation Originated by the First I/O Source and (II) at Least One I/O Operation Originated by the Second I/O Source The method 400 begins at step 402 with the first scheduler 310 receiving at least one I/O operation originated by a first I/O source. For example, the first scheduler 310 may be configured to receive at least one amongst the first set of I/O operations 302 via the first communication link 312 from the first given Vdrive application 114.

During the step 402 the first scheduler 310 also receives at least one I/O operation originated by a second I/O source. For example, the first scheduler 310 may be configured to receive at least one amongst the second set of I/O operations 304 via the second communication link 314 from the second given Vdrive application 114.

Step 404: Executing, by the First I/O Scheduler, a First Scheduling Algorithm to Determine a Scheduling Order of the at Least One I/O Operation Originated by the First I/O Source and at Least One I/O Operation Originated by the Second I/O Source, the First Scheduling Algorithm being Based on the Respective Pre-Determined Proportion of Processing Bandwidth of the Memory Drive Associated with the First I/O Source and the Second I/O Source, the Execution of the First Scheduling Algorithm Resulting in a First-Scheduled Order of I/O Operations The method 400 continues to step 404 with the first scheduler 310 executing the first scheduling algorithm being a fair-type scheduling algorithm.

As explained above, the first scheduler 310 is configured to implement a given fair-type scheduling scheme that allows ordering the I/O operations from the first set of I/O operations 302 and from the second set of I/O operations 304 such that the drive bandwidth of the memory drive 126 for executing the ordered I/O operations is used in accordance with the first pre-determined proportion and the second pre-determined proportion.

Put another way, the given fair-type scheduling scheme orders the I/O operations from the first set of I/O operations 302 and from the second set of I/O operations 304 such that the drive bandwidth of the memory drive 126 is used "fairly" which, in at least some of the non-limiting embodiments of the present technology, means in accordance with the respective first and second pre-determined proportions of drive bandwidth.

Thus, it can be said that the first scheduler 310 is employing the fair-type scheduling algorithm, as mentioned above, for generating a fair-scheduled order of I/O operations based on the first pre-determined proportion and the second pre-determined proportion of the drive bandwidth of the memory drive 126.

Therefore, execution of the first scheduling algorithm (e.g., the fair-type scheduling algorithm) results in a first-scheduled order of I/O operations (e.g., the fair-scheduled order of I/O operations).

Which fair-type scheduling algorithm the first scheduler 310 is configured to implement is not particularly limiting. However, in one non-limiting example, the first scheduler 310 may be implemented as a given Deficit Round Robin (DRR) scheduling algorithm, which means that the first scheduler 310 may be implemented as a DRR-type scheduler.

Irrespective of which specific fair-type scheduling algorithm (irrespective of which specific first scheduling algorithm) the first scheduler 310 implements, the first scheduler 310 is configured to determine in which order I/O operations from the first set of I/O operations 302 and from the second set of I/O operations 304 are to be transmitted for execution by the memory drive 126 such that the drive bandwidth of the memory drive 126 is used in a fair manner.

Step 406: Transmitting the First-Scheduled Order of I/O Operations to the Second I/O Scheduler The method continues to step 406 with the first scheduler 310 being configured to transmit the first-scheduled order (the fair-scheduled order) of I/O operations to the second scheduler 320. For example, the first-scheduled order of I/O operations may be transmitted by the first scheduler 310 to the second scheduler 320 via the communication link 316. As mentioned above, the first-scheduled order of I/O operations may comprise I/O operations from the first set of I/O operations 302 and from the second set of I/O operations 304 that are ordered in a fair manner.

It is contemplated that in some embodiments of the present technology, the first scheduler 310 may transmit the first-scheduled order (the fair-scheduled order) of I/O operations directly to the second scheduler 320.

For example, instead of transmitting the first-scheduled order of I/O operations to an intermediary I/O stack being located between the first scheduler 310 and the second scheduler 320 and then transmitting the I/O operations from the intermediary I/O stack to the second scheduler 320, the first scheduler 310 may transmit the first-scheduled order of I/O operations directly to the second scheduler 320 without requiring the intermediary I/O stack.

Hence, it is contemplated that the communication link 316 may be a direct communication link between the first scheduler 310 and the second scheduler 320 such that I/O operations transmitted from the first scheduler 310 to the second scheduler 320 are not received/intercepted by any intermediary I/O stack located between the first scheduler 310 and the second scheduler 320. It is contemplated that the hybrid scheduler 300 may not require having the intermediary I/O stack between the first scheduler 310 and the second scheduler 320.

Step 408: Executing, by the Second I/O Scheduler, a Second Scheduling Algorithm to Determine a Rescheduled Order of I/O Operations for the First-Scheduled Order of I/O Operations, the Second Scheduling Algorithm being Based on Respective Execution Deadlines of the at Least One I/O Operations Originated by the First I/O Source and the at Least One I/O Operations Originated by the Second I/O Source The method 400 continues to step 408 with the second scheduler 320 executing a second scheduling algorithm being a real-time-type scheduling algorithm.

As explained above, in order to support real-time requirements of the distributed processing system 100, the second scheduler 320 may provide a real-time scheduling scheme that may allow execution of I/O operations before (in accordance with) the respective execution deadlines. In other words, the second scheduler 320 is configured to order (or in this case, potentially re-order) the I/O operations for transmission for execution by the memory drive 126 such that the I/O operations may be executed by the memory drive 126 before the respectively associated deadlines.

Thus, it can be said that the second scheduler 320 is employing the real-time-type scheduling algorithm, as mentioned above, for generating a real-time-scheduled order of I/O operations based on the respective execution deadlines of the I/O operations.

Therefore, execution of the second scheduling algorithm (e.g., the real-time-type scheduling algorithm) based on the first-scheduled order of I/O operations (e.g., the fair-scheduled order of I/O operations) results in a re-scheduled order of I/O operations (e.g., the real-time-scheduled order of I/O operations).

Which real-time-type scheduling algorithm the second scheduler 320 is configured to implement is not particularly limiting. However, in one non-limiting example, the second scheduler 320 may be implemented as a given Earliest Deadline First (EDF) scheduling algorithm, which means that the second scheduler 320 may be implemented as an EDF-type scheduler.

Irrespective of which specific real-time-type scheduling algorithm (irrespective of which specific second scheduling algorithm) the second scheduler 320 implements, the second scheduler 320 is configured to determine a real-time-scheduled order of I/O operations received thereby for allowing execution of I/O operations by the memory drive 126 before their respective execution deadlines.

Step 410: Monitoring, by the Hybrid I/O Operations Scheduler, Whether Execution of the at Least One I/O Operations Originated by the First I/O Source and the at Least One I/O Operations Originated by the Second I/O Source Respects the Respective Execution Deadlines The method 400 continues to step 410 with the hybrid scheduler 300 monitoring whether execution of the at least one I/O operations originated by the first I/O source and the at least one I/O operations originated by the second I/O source respects the respective execution deadlines.

In some embodiments, this means that the hybrid scheduler 300 may monitor whether the at least one I/O operations originated by the first I/O source and the at least one I/O operations originated by the second I/O source are executable before the respective execution deadlines (e.g., monitoring that includes the a priori analysis as described above).

Additionally or alternatively, this means that the hybrid scheduler 300 may monitor whether the at least one I/O operations originated by the first I/O source and the at least one I/O operations originated by the second I/O source are actually executed before the respective execution deadlines (e.g., monitoring that includes the posteriori analysis as described above).

Step 412: In Response to Determining that the Execution of at Least One I/O Operation does not Respect the Respective Execution Deadline, Pausing Accepting Additional I/O Operations by the Second I/O Scheduler from the First I/O Scheduler The method continues to step 412 where, in response to determining that the execution of at least one I/O operation does not respect the respective execution deadline, the second scheduler 320 pauses accepting additional I/O operations from the first scheduler 310.

In some embodiments, when the hybrid scheduler 300 performs during the step 410 monitoring that includes the apriori analysis, the hybrid scheduler 300 may determine that the execution of at least one I/O operation does not respect the respective execution deadline by determining that the at least one I/O operation is not going to be executed by the memory drive 126 before the respective execution deadline if transmitted to the memory drive 126 in accordance with rescheduled order of I/O operations.

For example, the hybrid scheduler 300 may determine that the at least one I/O operation is not going to be executed by the memory drive 126 before the respective execution deadline if transmitted to the memory drive 126 in accordance with rescheduled order of I/O operations when the second scheduler 320 is not able to determine a real-time-scheduled order in which I/O operations are potentially executable before their respective deadlines.

In other embodiments, when the hybrid scheduler 300 performs during the step 410 monitoring that includes the apriori analysis, the hybrid scheduler 300 may determine that the execution of at least one I/O operation does not respect the respective execution deadline by determining that the at least one I/O operation is not going to be executed by the memory drive 126 before the respective execution deadline if an additional I/O operation is received from the first scheduler 310.

For example, the second scheduler 320 may determine that, by receiving the additional I/O operation and placing it in the rescheduled order of I/O operations based on the respective execution deadline, at least one I/O operation in the rescheduled order is not going to be executed by the memory drive 126 before its respective execution deadline.

Additionally or alternatively, when the hybrid scheduler 300 performs during the step 410 monitoring that includes the apriori analysis, the hybrid scheduler 300 may determine that the execution of at least one I/O operation does not respect the respective execution deadline by determining that the at least one I/O operation is not actually executed by the memory drive 126 before the respective execution deadline.

For example, the hybrid scheduler 300 may be configured to receive execution confirmations of I/O operations that have been previously transmitted by the hybrid scheduler 300 to the memory drive 126 for execution. As such, if the execution of a given I/O operations has occurred after the respective execution deadline, the hybrid scheduler 300 may determine that the execution of at least one I/O operation does not respect the respective execution deadline.

It should be noted that pausing accepting, by the second scheduler 320, additional I/O operations from the first scheduler 310 is a result of a selective switch of the hybrid scheduler 300 from the standard mode of operation to the high-demand mode of operation.

In some embodiments, the pausing accepting by the second scheduler 320 additional I/O operations from the first scheduler 310 comprises stopping, by the second scheduler 320, accepting the additional I/O operations.

In other embodiments, the pausing accepting by the second scheduler 320 additional I/O operations from the first scheduler 310 comprises transmitting, by the second scheduler 320, the feedback signal 342 to the first scheduler 310. The feedback signal 342 may be instrumental in the first scheduler 310 stopping sending additional I/O operations to the second scheduler 320 as explained above.

It is contemplated that the hybrid scheduler 300 may be configured to, irrespective of whether the hybrid scheduler 300 is in the standard mode of operation or in the high-demand mode of operation, further (i) receive at least one additional I/O operations originated by the first I/O source, and (ii) receive at least one additional I/O operations originated by the second I/O source.

It is contemplated that the at least one additional I/O operations received by the first scheduler 310 during the high-demand mode of operation are not returned to the respective I/O source. Indeed, the at least one additional I/O operations received by the first scheduler 310 during the high-demand mode of operation will remain at the first scheduler 310 until the hybrid scheduler 300 is selectively switched to the standard mode of operation.

It is contemplated that the second scheduler 320 may resume receiving the additional I/O operations from the first scheduler 310.

In some embodiments of the present technology, the hybrid scheduler 300 may determine that the execution of I/O operations received by the second scheduler 320 does respect the respective execution deadlines as explained above. It is contemplated that in other embodiments, the second scheduler 320 may resume receiving the additional I/O operations from the first scheduler 310 in response to determining that the execution of I/O operations received by the second scheduler 320 does respect the respective execution deadlines.

It should be noted that resuming receiving, by the second scheduler 320, additional I/O operations from the first scheduler 310 is a result of a selective switch of the hybrid scheduler 300 from the high-demand mode of operation to the standard mode of operation.

It is contemplated that in some embodiments of the present technology, the hybrid scheduler 300 may be configured to operate in the standard mode of operation when the second scheduler 320 accepts the additional I/O operations from the first scheduler 310. Also the hybrid scheduler 300 may be configured to operate in the high-demand mode of operation when the second scheduler 320 pauses accepting additional I/O operations from the first scheduler 310.

It is contemplated that the hybrid scheduler 300 in the standard mode of operation (i) may provide a fair allocation of processing bandwidth of the memory drive 126 for each one of the first I/O source and the second I/O source; and (ii) may support a real-time requirements of the first I/O source and the second I/O source.

It is also contemplated that the hybrid scheduler 300 in the high-demand mode of operation may provide the fair allocation of processing bandwidth of the memory drive 126 for each one of the first I/O source and the second I/O source.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of scheduling I/O operations for execution by a memory drive, the memory drive being implemented as part of a distributed computer-processing system having:
    a plurality of I/O sources providing the I/O operations, the plurality of I/O sources having a first I/O source and a second I/O source,
        each one of the first I/O source and the second I/O source being associated with a respective pre-determined proportion of processing bandwidth of the memory drive for executing the respective I/O operations of the first I/O source and of the second I/O source;
    a hybrid I/O operations scheduler, the hybrid I/O operations scheduler having a first I/O scheduler and a second I/O scheduler;
the method executable by the hybrid I/O operations scheduler, the method comprising:
    receiving, by the first I/O scheduler, (i) at least one I/O operation originated by the first I/O source and (ii) at least one I/O operation originated by the second I/O source;
    executing, by the first I/O scheduler, a first scheduling algorithm to determine a scheduling order of the at least one I/O operation originated by the first I/O source and at least one I/O operation originated by the second I/O source, the first scheduling algorithm being based on:
        the respective pre-determined proportion of processing bandwidth of the memory drive associated with the first I/O source and the second I/O source,
        the execution of the first scheduling algorithm resulting in a first-scheduled order of I/O operations;
    transmitting the first-scheduled order of I/O operations to the second I/O scheduler;
    executing, by the second I/O scheduler, a second scheduling algorithm to determine a rescheduled order of I/O operations for the first-scheduled order of I/O operations, the second scheduling algorithm being based on:
        respective execution deadlines of the at least one I/O operations originated by the first I/O source and the at least one I/O operations originated by the second I/O source,
    monitoring, by the hybrid I/O operations scheduler, whether execution of the at least one I/O operations originated by the first I/O source and the at least one I/O operations originated by the second I/O source respects the respective execution deadlines;
    in response to determining that the execution of at least one I/O operation does not respect the respective execution deadline, pausing accepting additional I/O operations by the second I/O scheduler from the first I/O scheduler.

2. The method of claim 1, wherein the monitoring whether the execution of the at least one I/O operations originated by the first I/O source and the at least one I/O operations originated by the second I/O source respects the respective execution deadlines comprises:
    monitoring, by the second I/O scheduler, whether the at least one I/O operations originated by the first I/O source and the at least one I/O operations originated by the second I/O source are executable before the respective execution deadlines.

3. The method of claim 2, wherein the determining that the execution of at least one I/O operation does not respect the respective execution deadline comprises:
    determining, by the second I/O scheduler, that the at least one I/O operation is not going to be executed by the memory drive before the respective execution deadline if transmitted to the memory drive in accordance with rescheduled order of I/O operations.

4. The method of claim 2, wherein the determining that the execution of at least one I/O operation does not respect the respective execution deadline comprises:
    determining, by the second I/O scheduler, that the at least one I/O operation is not going to be executed by the memory drive before the respective execution deadline if an additional I/O operation is received from the first I/O scheduler.

5. The method of claim 1, wherein the monitoring whether the execution of the at least one I/O operations originated by the first I/O source and the at least one I/O operations originated by the second I/O source respects the respective execution deadlines comprises:
    monitoring, by the hybrid I/O operations scheduler, whether the at least one I/O operations originated by the first I/O source and the at least one I/O operations originated by the second I/O source are actually executed before the respective execution deadlines.

6. The method of claim 5, wherein the determining that the execution of at least one I/O operation does not respect the respective execution deadline comprises:
    determining, by the hybrid I/O operations scheduler, that the at least one I/O operation is not actually executed by the memory drive before the respective execution deadline.

7. The method of claim 1, wherein the pausing comprises stopping, by the second I/O scheduler, accepting additional I/O operations by the second I/O operations scheduler.

8. The method of claim 1, wherein the pausing comprises transmitting, by the second I/O scheduler, a feedback signal to the first I/O operations scheduler, the feedback signal being instrumental in the first I/O operations scheduler stopping sending additional I/O operations to the second I/O operations scheduler.

9. The method of claim 1, wherein the method further comprises:
    receiving, by the first I/O operations scheduler, at least one additional I/O operations originated by the first I/O source; and
    receiving, by the first I/O operations scheduler, at least one additional I/O operations originated by the second I/O source.

10. The method of claim 9, wherein the method further comprises resuming, by the second I/O operations scheduler, receiving the additional I/O operations from the first I/O scheduler.

11. The method of claim 10, wherein the resuming is executed in response to determining, by the hybrid I/O operations scheduler, that the execution of further I/O operations received by the second I/O scheduler does respect the respective execution deadlines.

12. The method of claim 1, wherein the first I/O scheduler is a DRR-type scheduler.

13. The method of claim 1, wherein the second I/O scheduler is an EDF-type scheduler.

14. The method of claim 1, wherein the hybrid I/O operations scheduler operates:
in a standard mode of operation when the second I/O scheduler accepts the additional I/O operations from the first I/O scheduler; and
in a high-demand mode of operation when the second I/O scheduler pauses accepting additional I/O operations from the first I/O scheduler.

15. The method of claim 14, wherein:
in the standard mode of operation, the hybrid I/O operations scheduler:
provides a fair allocation of processing bandwidth of the memory drive for each one of the first I/O source and the second I/O source; and
supports a real-time requirements of the first I/O source and the second I/O source; and
in the high-demand mode of operation, the hybrid I/O operations scheduler:
provides the fair allocation of processing bandwidth of the memory drive for each one of the first I/O source and the second I/O source.

16. A storage device executing a hybrid I/O operations scheduler for scheduling I/O operations for execution by a memory drive, the memory drive being implemented as part of a distributed computer-processing system having:
a plurality of I/O sources providing the I/O operations, the plurality of I/O sources having a first I/O source and a second I/O source,
each one of the first I/O source and the second I/O source being associated with a respective pre-determined proportion of processing bandwidth of the memory drive for executing the respective I/O operations of the first I/O source and of the second I/O source;
the hybrid I/O operations scheduler having a first I/O scheduler and a second I/O scheduler, the hybrid I/O operations scheduler being configured to:
receive, by the first I/O scheduler: (i) at least one I/O operation originated by the first I/O source and (ii) at least one I/O operation originated by the second I/O source;
execute, by the first I/O scheduler, a first scheduling algorithm to determine a scheduling order of the at least one I/O operation originated by the first I/O source and at least one I/O operation originated by the second I/O source, the first scheduling algorithm being based on:
the respective pre-determined proportion of processing bandwidth of the memory drive associated with the first I/O source and the second I/O source,
the execution of the first scheduling algorithm resulting in a first-scheduled order of I/O operations;
transmit the first-scheduled order of I/O operations to the second I/O scheduler;
execute, by the second I/O scheduler, a second scheduling algorithm to determine a rescheduled order of I/O operations for the first-scheduled order of I/O operations, the second scheduling algorithm being based on:
respective execution deadlines of the at least one I/O operations originated by the first I/O source and the at least one I/O operations originated by the second I/O source,
monitor whether execution of the at least one I/O operations originated by the first I/O source and the at least one I/O operations originated by the second I/O source respects the respective execution deadlines;
in response to determining that the execution of at least one I/O operation does not respect the respective execution deadline, pause accepting additional I/O operations by the second I/O scheduler from the first I/O scheduler.

17. The storage device of claim 16, wherein the hybrid I/O operations scheduler configured to monitor whether the execution of the at least one I/O operations originated by the first I/O source and the at least one I/O operations originated by the second I/O source respects the respective execution deadlines comprises the hybrid I/O operations scheduler being configured to:
monitor whether the at least one I/O operations originated by the first I/O source and the at least one I/O operations originated by the second I/O source are executable before the respective execution deadlines.

18. The storage device of claim 17, wherein the hybrid I/O operations scheduler configured to determine that the execution of at least one I/O operation does not respect the respective execution deadline comprises the hybrid I/O operations scheduler being configured to:
determine that the at least one I/O operation is not going to be executed by the memory drive before the respective execution deadline if transmitted to the memory drive in accordance with rescheduled order of I/O operations.

19. The storage device of claim 17, wherein the hybrid I/O operations scheduler configured to determine that the execution of at least one I/O operation does not respect the respective execution deadline comprises the hybrid I/O operations scheduler being configured to:
determine that the at least one I/O operation is not going to be executed by the memory drive before the respective execution deadline if an additional I/O operation is received from the first I/O scheduler.

20. The storage device of claim 16, wherein the hybrid I/O operations scheduler configured to monitor whether the execution of the at least one I/O operations originated by the first I/O source and the at least one I/O operations originated by the second I/O source respects the respective execution deadlines comprises the hybrid I/O operations scheduler being configured to:
monitor whether the at least one I/O operations originated by the first I/O source and the at least one I/O operations originated by the second I/O source are actually executed before the respective execution deadlines.

21. The storage device of claim 20, wherein the hybrid I/O operations scheduler configured to determine that the execution of at least one I/O operation does not respect the respective execution deadline comprises the hybrid I/O operations scheduler configured to:
determine that the at least one I/O operation is not actually executed by the memory drive before the respective execution deadline.

22. The storage device of claim 16, wherein the hybrid I/O operations scheduler configured to pause comprises the hybrid I/O operations scheduler being configured to stop accepting additional I/O operations by the second I/O operations scheduler.

23. The storage device of claim 16, wherein the hybrid I/O operations scheduler configured to pause comprises the hybrid I/O operations scheduler being configured to transmit, by the second I/O scheduler, a feedback signal to the first I/O operations scheduler, the feedback signal being instrumental in the first I/O operations scheduler stopping sending additional I/O operations to the second I/O operations scheduler.

24. The storage device of claim 16, wherein the hybrid I/O operations scheduler is configured to:
receive, by the first I/O operations scheduler, at least one additional I/O operations originated by the first I/O source; and
receive, by the first I/O operations scheduler, at least one additional I/O operations originated by the second I/O source.

25. The storage device of claim 24, wherein the hybrid I/O operations scheduler is further configured to resume receiving by the second I/O operations scheduler the additional I/O operations from the first I/O scheduler.

26. The storage device of claim 25, wherein the hybrid I/O operations scheduler configured to resume is executed in response to determining, by the hybrid I/O operations scheduler, that the execution of further I/O operations received by the second I/O scheduler does respect the respective execution deadlines.

27. The storage device of claim 16, wherein the first I/O scheduler is a DRR-type scheduler.

28. The storage device of claim 16, wherein the second I/O scheduler is an EDF-type scheduler.

29. The storage device of claim 16, wherein the hybrid I/O operations scheduler operates:
in a standard mode of operation when the second I/O scheduler accepts the additional I/O operations from the first I/O scheduler; and
in a high-demand mode of operation when the second I/O scheduler pauses accepting additional I/O operations from the first I/O scheduler.

30. The storage device of claim 29, wherein:
in the standard mode of operation, the hybrid I/O operations scheduler:
provides a fair allocation of processing bandwidth of the memory drive for each one of the first I/O source and the second I/O source; and
supports a real-time requirements of the first I/O source and the second I/O source; and
in the high-demand mode of operation, the hybrid I/O operations scheduler:
provides the fair allocation of processing bandwidth of the memory drive for each one of the first I/O source and the second I/O source.

* * * * *